US009136760B2

(12) United States Patent
Wismar et al.

(10) Patent No.: US 9,136,760 B2
(45) Date of Patent: Sep. 15, 2015

(54) DIGITAL SWITCHED MODE VOLTAGE REGULATOR

(75) Inventors: Ulrik Sorensen Wismar, Kalundborg (DK); Soren Gaadestrup, Frederiksvaerk (DK)

(73) Assignee: ANALOG DEVICES GLOBAL, Hamilton (BM)

(*) Notice: Subject to any disclaimer, the term of this patent is extended or adjusted under 35 U.S.C. 154(b) by 474 days.

(21) Appl. No.: 13/534,753

(22) Filed: Jun. 27, 2012

(65) Prior Publication Data

US 2014/0002042 A1 Jan. 2, 2014

(51) Int. Cl.
*H02M 3/157* (2006.01)
*H02M 3/158* (2006.01)
*H02M 1/00* (2007.01)

(52) U.S. Cl.
CPC ............ *H02M 3/157* (2013.01); *H02M 3/1588* (2013.01); *H02M 2001/0054* (2013.01); *Y02B 70/1466* (2013.01); *Y02B 70/1491* (2013.01)

(58) Field of Classification Search
CPC ............ H02M 3/157; H02M 3/33515; H02M 2001/0012; G05F 1/575
USPC .................................................. 323/282, 283
See application file for complete search history.

(56) References Cited

U.S. PATENT DOCUMENTS

| 7,024,253 | B2 | 4/2006 | Gaikwad et al. |
| 7,394,236 | B2 | 7/2008 | Chapuis et al. |
| 7,773,016 | B2 | 8/2010 | Miao |
| 7,863,875 | B1 | 1/2011 | Guo et al. |
| 7,952,337 | B2 | 5/2011 | Gurcan |
| 8,130,522 | B2 * | 3/2012 | Maksimovic ................... 363/89 |
| 8,810,221 | B2 * | 8/2014 | Hunt et al. ..................... 323/283 |
| 2007/0210777 | A1 | 9/2007 | Cervera et al. |
| 2010/0308654 | A1 | 12/2010 | Chen |
| 2011/0062929 | A1 | 3/2011 | Strydom et al. |
| 2011/0074368 | A1 | 3/2011 | Gurcan |
| 2011/0127983 | A1 | 6/2011 | Peng et al. |

FOREIGN PATENT DOCUMENTS

| CN | 101179228 A | 5/2008 |
| WO | 2011033004 A1 | 3/2011 |

* cited by examiner

*Primary Examiner* — Adolf Berhane
*Assistant Examiner* — Jye-June Lee
(74) *Attorney, Agent, or Firm* — Kenyon & Kenyon LLP (57) ABSTRACT

The present invention relates to a switched mode voltage regulator circuit comprising a regulation loop coupled between the output voltage of the regulator and a switch driver. The regulation loop comprising an error signal generator supplying a digital error signal representative of a voltage difference between the output voltage and a reference voltage. The regulation loop further comprises a linear digital filter and a non-linear digital filter both coupled for receipt of the digital error signal and a digital summer coupled for receipt of linearly and non-linearly filtered digital error signals to provide a combined digital error signal. A digital pulse modulator is configured to generate the pulse width or pulse density modulated driver control signal in accordance with the combined digital error signal.

20 Claims, 5 Drawing Sheets

DIGITAL SWITCHED MODE VOLTAGE REGULATOR

The present invention relates to a switched mode voltage regulator circuit comprising a regulation loop coupled between the output voltage of the regulator and a switch driver. The regulation loop comprising an error signal generator supplying a digital error signal representative of a voltage difference between the output voltage and a reference voltage. The regulation loop further comprises a linear digital filter and a non-linear digital filter both coupled for receipt of the digital error signal and a digital summer coupled for receipt of linearly and non-linearly filtered digital error signals to provide a combined digital error signal. A digital pulse modulator is configured to generate the pulse width or pulse density modulated driver control signal in accordance with the combined digital error signal.

BACKGROUND OF THE INVENTION

U.S. Pat. No. 7,952,337 discloses a hybrid switching voltage regulator of boost and/or buck topology. The voltage regulator comprises two separate feedback control loops wherein a first loop is an entirely analog and fast control loop and a second loop is a digital and slower feedback loop. The digital control loop comprises a DCB circuit which includes A/D and D/A converters surrounding an intermediate digital control engine.

US 2011/127983 discloses a system and method for controlling a digital pulse-width modulated power converter and achieves fast large-signal transient response while maintaining a slow response near the steady-state operating point in order to assure stability. Digital output error samples are processed through a gain scheduling block that applies a non-linear gain function to produce a weak loop response when the system is near its steady-state equilibrium point and a strong loop response when large transients are encountered.

Switched mode voltage regulator circuits are generally accepted as highly efficient power converter topologies for a diverse range of applications for example DC-DC voltage conversion or DC-AC voltage conversion etc. The regulator output voltage must generally be configured to track a predefined DC or AC reference voltage with high accuracy. A regulation loop is provided for the latter purpose and electrical characteristics of the regulation loop determine how accurate the reference voltage can be tracked. One type of switched mode voltage regulator circuits comprises regulation loops of PI type providing Proportional and Integral control. The speed at which the voltage regulator circuit is able to responding to load changes at the regulator output voltage is largely determined by how fast an integrator portion of the regulation loop can pull the regulator output voltage back to the set-point voltage indicated by predefined reference voltage. Therefore, a high or large integrator gain of the integrator portion of the regulation loop is advantageous.

Unfortunately, a high integrator gain tends to make the voltage regulator unstable in accordance with conditions determined by traditional feedback control theory. Consequently, it would be desirable to provide a voltage regulator with higher integrator gain than prior art voltage regulators to improve response time to load fluctuations and tracking accuracy of the regulator output voltage. It would also be advantageous to provide a PI regulation loop with high loop gain without stability problems and comprising digital processing of a digital error signal. It would furthermore be advantageous to minimize the amount of analog and/or digital circuitry of the regulation loop to reduce complexity, size and costs of the switched mode voltage regulator.

SUMMARY OF THE INVENTION

A first aspect of the invention relates to a switched mode voltage regulator circuit comprising an input terminal for receipt of a regulator input voltage and an output terminal connectable to an output capacitor for supply of an output voltage. The switched mode voltage regulator circuit comprises a converter inductance configured for energy charging from the regulator input voltage through a first semiconductor switch in a first regulator mode and for discharge of stored energy to the output voltage through a second semiconductor switch in a second regulator mode. A switch driver is configured to supply switch control signals to the first and second semiconductor switches in accordance with one of a pulse width and pulse density modulated driver control signal. A regulation loop is coupled between the output voltage and the input driver and comprises an error signal generator operatively coupled to the output voltage and a reference voltage. The error signal generator is configured to supply a digital error signal representative of a voltage difference between the output voltage and the reference voltage. A linear digital filter is coupled for receipt of the digital error signal to provide a linearly filtered digital error signal, and a non-linear digital filter coupled for receipt of the digital error signal to provide a non-linearly filtered digital error signal. A digital summer is coupled for receipt of the linearly and the non-linearly filtered digital error signals to provide a combined or hybrid digital error signal. A digital pulse modulator is configured to generate the pulse width or density modulated driver control signal in accordance with the combined digital error signal.

The switched mode voltage regulator circuit may be adapted to step-up and/or step-down of the regulator input voltage by incorporating a boost power converter, a buck power converter or a boost-buck type of power converter. The skilled person will understand that these different power converter topologies can be designed by selecting an appropriate coupling of the converter inductance and the first and second semiconductor switches. Preferably, at least one, and preferably both, of the first and second semiconductor switches comprises a MOS, bipolar or IGBT transistor(s). The MOS transistor may be a NMOS transistor formed in a CMOS semiconductor die or substrate comprising the entire or a main portion of the switched mode voltage regulator circuit. The converter inductance may comprise an external inductor that is coupled to the integrated portion of the switched mode voltage regulator circuit though appropriately configured pad(s) and terminal(s) thereof.

The parallel connection of the linear digital filter and the non-linear digital filter within the regulation loop enables the regulation loop to rapidly responding to load fluctuations at the output voltage through the linear digital if the latter is configured as a linear proportional gain portion or path of the regulation loop. The non-linear digital filter preferably comprises a non-linear integrator with high gain operating as a non-linear integral portion of the regulation loop. The non-linear integral portion ensures good steady-state tracking, i.e. small voltage error, between the output voltage and the desired or set-point output voltage. If the non-linear digital filter comprises a range of the digital error signal where the gain applied to the digital error signal is small or even zero, the integral portion of the regulation loop may be unable to respond to small or moderate load fluctuations at the output voltage. However, the provision of the linear digital filter within the regulation loop allows the latter to respond to such small load fluctuations because the parallel coupling essentially bypasses a non-responsive or weakly responsive state of the non-linear digital filter.

Furthermore, since both the linear digital filter, the non-linear digital filter and the digital summer are designed or adapted to operating in the digital domain responding to the same digital error signal, these components or circuits can be designed, fully integrated and fabricated in digital CMOS semiconductor processes with small die area consumption and at low costs. Hence, it is possible to provide the switched mode voltage regulator circuit with a PI regulation loop operating entirely in the digital domain.

The output voltage preferably comprises one of a DC output voltage and an AC output voltage. If the output voltage is a DC voltage, the reference voltage may be set to reflect the nominal or set-point DC output voltage at the output terminal of the switched mode regulator. In other embodiments, the reference voltage may be set to reflect a desired AC output voltage. The reference voltage may be equal to, or proportional to, the desired AC output voltage such that the regulation loops ensures that the AC output voltage dynamically tracks or follows the indicated reference voltage within accuracy and time delay constraints set by dynamic characteristics of the regulation loop or closed feedback loop.

The error signal generator comprises at least one analog-to-digital converter for sampling of the output voltage. However, the error signal generator may nevertheless be configured to generate the digital error signal in several different ways. In one embodiment of invention, the error signal generator comprises an analog-to-digital converter operatively coupled to the output voltage and the reference voltage to produce the digital error signal at a converter output. The reference voltage may accordingly be applied directly to the analog-to-digital converter as an analog reference voltage in this embodiment. This allows the analog-to-digital converter directly, i.e. without additional manipulation or computations on the output voltage or the reference voltage, to generating the digital error signal at the converter output as a difference between the output voltage (or a scaled version thereof) and the reference voltage.

Another embodiment of the error signal generator comprises an analog-to-digital converter coupled to the output voltage to produce a digital output voltage representative of the output voltage. A digital reference voltage representative of the reference voltage is provided for example by sampling an analog reference voltage. The digital error signal is produced by a digital subtractor receiving and subtracting the digital output voltage and the digital reference voltage. In yet another embodiment, the error signal generator comprises an analog subtractor operatively coupled to the output voltage and the reference voltage to produce an analog error signal. The digital error signal is produced by sampling the analog error signal by the analog-to-digital converter.

The type and characteristics of the analog-to-digital converter may vary depending on specific performance requirements of the switched mode voltage regulator circuit in question such as converter input voltage range and output voltage range, response speed, static output error voltage etc. The analog-to-digital converter preferably comprises a flash A/D converter which may have a predetermined resolution, preferably less than 8 bits of resolution such as between 3 and 6 bits, to keep circuit complexity, area and power consumption at an acceptable level. Flash A/D converter types are generally advantageous for feedback loop applications because of low conversion time or latency which imposes a minimum of time delay to the regulation/feedback loop and hence improve loop stability. The conversion time or latency of the analog-to-digital converter is preferably less than 1 µs such as less than 0.1 µs, which are requirements that are easily met by an appropriately designed flash type A/D converter.

In a preferred embodiment of the invention, the non-linear digital filter comprises a non-linear integrator having an integrator gain varying in dependence of a value of the digital error signal. The integrator gain preferably varies depending on a numerical value of the value of the digital error signal such that the same positive and negative value of the digital error signal leads to the same integrator gain. The gain of the non-linear integrator is preferably smaller for small numerical values of the digital error signal than for large numerical values of the digital error signal. In the latter embodiment, the integrator gain is kept small for small numerical values of the digital error signal, i.e. when the output voltage is relatively close to the nominal or set-point voltage. For large numerical values of the digital error signal, where the output voltage deviates more from the reference voltage, the integrator gain is larger than for the small numerical values of the error signal. This adaptive integrator gain scheme allows a higher gain setting of the non-linear integrator without inducing instability or oscillation of the voltage regulator than possible with a constant integrator gain. This is because the regulation loop only needs to stabilize around the setpoint or nominal output voltage which is ensured by the low integrator gain in proximity of the set-point output voltage. The larger or higher integrator gain provided when the output voltage deviates more from the set-point output voltage would result in an unstable regulation loop if the higher integrator gain was to be retained for a long time. However, the dynamic operation of the regulation loop with at high integrator gains forces the output voltage towards the set-point voltage such that the high integrator gain is not retained for a long time. Instead, the higher integrator gain leads to an advantageous improvement of the response speed of the switched mode voltage regulator circuit to load fluctuations.

The skilled person will understand that the beneficial variation or adaptation of integrator gain based on the numerical value of the digital error signal can be implemented in numerous ways. A preferred embodiment of the non-linear integrator comprises a counter circuit having a counter gain depending on the value of the digital error signal. The gain of the counter circuit is preferably set to a first constant gain value between upper and lower threshold values of the digital error signal. The gain of the counter circuit may be set to a second constant gain value outside the upper and lower threshold values of the digital error signal such that the value of first constant gain is smaller than the second constant gain. The upper and lower threshold values are preferably symmetrically arranged around a predetermined value of the digital error signal such as zero value. The zero value of the digital error signal preferably corresponds to a situation where the output voltage substantially equals the reference voltage setting. In one embodiment, the first constant gain value is zero while the second constant gain value is different from zero. The gain of the counter circuit accordingly abruptly changes once the value of the digital error signal exceeds the upper or the lower threshold value.

The upper and lower threshold values are preferably set by a digital threshold circuit comparing the instantaneous value of the digital error signal to at least one of the upper and lower threshold values. The digital threshold circuit is furthermore configured to interrupt or halt counting of the counter circuit for values of the digital error signal between the upper and lower threshold values. The counter circuit comprises a clock input that may be driven by a system clock signal or a clock signal derived therefrom. Consequently, a current value of the counter output is retained despite the application of clock pulses to the clock input if the value of digital error signal falls between the upper and lower threshold values. This leads to an integrator gain setting of zero.

On the other hand, if the value of digital error signal falls outside the upper and lower threshold values, the counter output is incremented or decremented in accordance with the system clock signal and the polarity of the digital error signal. The counter circuit may comprise a sign evaluation circuit to determine a polarity of the digital error signal and actuate an up/down control input of the counter accordingly. The gain of the counter circuit for values of the digital error signal outside the upper and lower threshold values may conveniently be controlled by adjustable clock divider in accordance with a preferred embodiment. The adjustable clock divider supplies a clock signal with variable clock frequency to the clock input of the counter circuit. As mentioned above, the clock signal may be derived from the system clock signal. By altering the division ratio of the clock adjustable clock divider, the frequency of the clock signal applied to the clock input of the counter can be increased or decreased leading to a faster or slower rate of counting of the counter circuit or equivalently to a lower or higher gain, respectively, of the integrator function. Hence, the counter circuit may be adapted to simply decrease the frequency of the clock input, through selection of an appropriate division factor, for values of the digital error signal between the upper and lower threshold values rather than completely halting the counting.

In one embodiment of the switched mode voltage regulator circuit, the linear digital filter comprises a gain table mapping values of the digital error signal to proportional values of the linearly filtered digital error signal. The gain table is a convenient measure, with low consumption of semiconductor area, to implement a linear gain function when the total number of possible values of the digital error signal is relatively small for example. This is the case where the digital error signal is represented by 3-6 bits as mentioned above. In this embodiment, the linear digital filter may be without any frequency selective filtration of the digital error signal. In embodiments of the invention where the non-linear digital filter comprises the above-mentioned non-linear integrator, the additional feedback signal path formed through the parallel linear digital filter ensures that the regulation loop is able to respond to small changes of the digital error signal where the gain of the non-linear integrator may be small or substantially zero. This is beneficial because the non-zero gain of the linear digital filter maintains fast suppression of small load changes at the output voltage despite the small or even zero gain (i.e. dead-band) of the non-linear integrator.

In an advantageous embodiment of the invention, the digital pulse modulator is configured to provide both pulse width and pulse density modulation of the driver control signal based on a level of the combined digital error signal. In this embodiment, the driver control signal preferably comprises a combination of pulse width and pulse density modulation when a level of the combined digital error signal is below a predetermined error threshold. Preferably, the digital pulse modulator is configured to generate exclusively a pulse width modulated driver control signal when the level of the combined digital error signal is above the predetermined error threshold. The pulse width modulated driver control signal in the latter situation where the load on the output voltage is large allows efficient charging thereof.

A second aspect of the invention relates to a method of generating an output voltage by a switched mode voltage regulator circuit from a regulator input voltage, comprising steps of:

charging a converter inductance with energy from the regulator input voltage through a first semiconductor switch in a first regulator mode, discharging stored energy to the output voltage through a second semiconductor switch in a second regulator mode, generating non-overlapping switch control signals to the first and second semiconductor switches in accordance with at least one of a {pulse width, pulse density, pulse width and pulse density} modulated driver control signal, generating a digital error signal representative of a voltage difference between the output voltage and a reference voltage, generating a linearly filtered digital error signal from the digital error signal by a linear digital filter, generating a non-linearly filtered digital error signal from the digital error signal by a non-linear digital filter, combining the linearly and the non-linearly filtered digital error signals to provide a combined digital error signal, applying the combined digital error signal to a digital pulse modulator configured to generate the pulse width, or the pulse density, or the pulse width and pulse density modulated driver control signal in accordance with the combined digital error signal.

BRIEF DESCRIPTION OF THE DRAWINGS

A preferred embodiment of the invention will be described in more detail in connection with the appended drawings, in which.

DETAILED DESCRIPTION OF PREFERRED EMBODIMENTS

The embodiments described in detail below are particularly well-suited for switched-mode power converters such as DC-DC converters providing voltage step-up i.e. a boost type of converter or voltage regulator. However, the skilled person will understand that power converter in accordance with the present invention are highly useful for other types of applications both DC to AC voltage converting applications.

Figure 1:
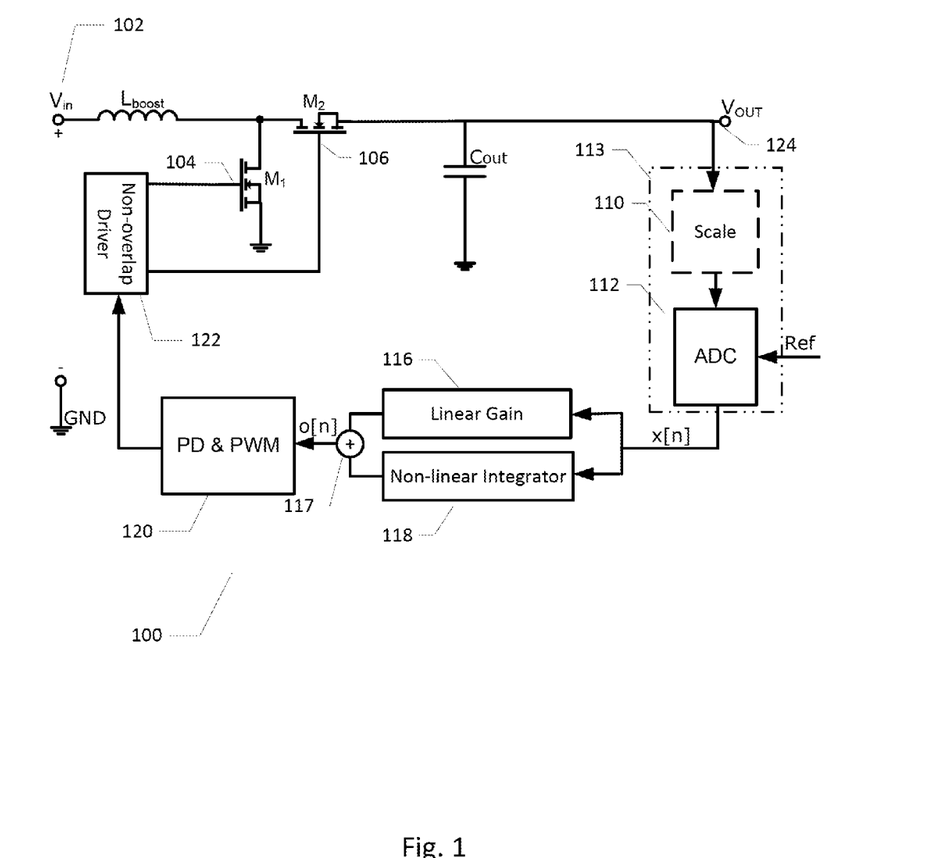
FIG. 1 illustrates schematically a switched mode voltage regulator circuit in accordance with a first embodiment of the invention.

FIG. 1 illustrates schematically a boost-type of switched mode voltage regulator circuit 100 in accordance with a first embodiment of the invention. The switched mode voltage regulator circuit 100 comprises an input terminal 102 for receipt of a regulator input voltage $V_{in}$ for example a DC power rail or a DC voltage from a rechargeable battery. An output terminal 124 is electrically coupled to an output capacitor $C_{out}$ for supply of a DC output voltage $V_{OUT}$. A converter inductance is provided by an inductor $L_{boost}$ which is electrically coupled to the regulator input voltage such that $L_{boost}$ is charged with energy from $V_{in}$ through a first semiconductor switch, formed by CMOS transistor $M_1$, in a first regulator mode. In the first regular mode, the CMOS transistor $M_1$ is placed in a conducting state or on-state by non-overlapping switch driver 122 by applying an appropriate gate voltage to gate terminal 104 of $M_1$. The non-overlapping switch driver 122 furthermore places a second semiconductor switch, in form of CMOS transistor $M_2$, in a non-conducting state or off-state blocking flow of current from the converter inductance to the output capacitor $C_{out}$. In a second regulator mode, the stored energy in $L_{boost}$ is discharged into the output capacitor $C_{out}$ through the second semiconductor switch $M_2$, so as to raise the DC output voltage $V_{OUT}$. In the second regulator mode, the CMOS transistor $M_2$ is placed in a conducting state or on-state by non-overlapping switch driver 122 by applying an appropriate gate voltage signal to gate terminal 106 of $M_2$. The first semiconductor switch $M_1$ is placed in a non-conducting state or off-state blocking the flow of current from the converter inductance $L_{boost}$ to ground and forcing the inductor current through the low-impedance conductive path through the drain-source terminals of $M_2$. A load (not shown) of the voltage regulator such as a resistive or inductive load will normally be coupled to the DC output voltage $V_{out}$ to discharge the latter. The switch driver is preferably configured to supply non-overlapping gate voltage signals to the first and second semiconductor switches $M_1$ and $M_2$, where each gate voltage signals is pulse width and/or pulse density modulated. The voltage transfer ratio of the present switch mode regulator 100 follows the well-known rule:

$$V_{out} = V_{in}*(1/(1-D));$$

wherein D is a duty cycle of the gate control signals that can vary between 0 and 1. $D=t_{ON}/(t_{ON}+t_{OFF})$; wherein $t_{ON}$ and $t_{OFF}$ are equal to an on-time period and an off-time period, respectively, of the gate control signal of the semiconductor switch $M_1$.

Hence, by adjusting the duty cycle D, of the gate voltage signals, the level of the DC output voltage can be controlled, i.e. increased or decreased in a desirable manner depending on a reference or target setting of $V_{OUT}$.

The switched mode voltage regulator circuit 100 comprises a regulation or feedback loop coupled between $V_{OUT}$ and the input of the non-overlapping switch driver 122 for the purpose of adjusting the level of $V_{OUT}$ to a DC reference voltage. The regulation loop comprises an error signal generator 113 operatively coupled to $V_{OUT}$ through an optional voltage scaling circuit 110 and operatively coupled to a reference voltage schematically depicted by the arrow "Ref". The voltage scaling circuit 110 may be used to divide or decrease a high DC output voltage to a lower DC voltage level compatible with an input voltage range of the analog-to-digital converter 112 of the error signal generator 113. The error signal generator 113 produces an output signal in form of a digital error signal x[n] that is transmitted or fed to a parallel digital filter combination 116, 118 for processing as described below in additional detail.

The digital error signal is representative of a voltage difference between $V_{out}$ and the DC reference voltage Ref applied to the input of the error signal generator 113. The digital error signal x[n] may accordingly assume positive, negative and zero value depending on whether $V_{out}$ is larger, smaller or equal to the DC reference voltage. The digital error signal x[n] is applied to a linear digital filter 116 which is configured to provide a linearly filtered digital error signal and a non-linear digital filter 118 configured to provide a non-linearly filtered digital error signal. The linearly and non-linearly filtered digital error signals are combined by a digital adder or summer 117 to produce a hybrid or combined digital error signal o[n]. The combined digital error signal o[n] accordingly comprises output signal components from the parellelly coupled digital filters 116, 118. The combined digital error signal o[n] is subsequently applied to a hybrid type of digital modulator 120 that controls the duty cycle D of the non-overlapping driver 122 in a PWM mode and a pulse density of the non-overlapping driver 122 in a PDM mode. The hybrid digital modulator 120 applies a pulse density modulated driver control signal to the non-overlapping driver 122 for small values of the mixed digital error signal o[n], i.e. below a certain pre-set threshold value, because fewer state transitions are induced in the first and second semiconductor switches $M_1$ and $M_2$ by pulse density modulation than pulse width modulation. Consequently, the use of the pulse density modulated driver control signal leads to a reduction of switching power losses in the transistor switches $M_1$ and $M_2$. Since, these transistor switches typically are of considerable size and capacitance to support a maximum load power specification of the voltage regulator 100, the reduction of switching losses has a significant beneficial impact on the power efficiency of the switched mode voltage regulator circuit 100. For large values of the combined digital error signal o[n], the pulse width modulated driver control signal is applied to the non-overlapping driver 122. Such large values of o[n] correspond to large loads and large output currents at the DC output voltage of the voltage regulator circuit so that pulse width modulated driver control signal are advantageous because the generation of PWM pulses at the modulation frequency allows large average power to be transmitted through the first and second semiconductor switches $M_1$, $M_2$ to the DC output voltage.

The error signal generator 113 comprises the analog-to-digital converter 112 coupled to the DC output voltage through the optional voltage scaling circuit 110. The analog-to-digital converter 112 is preferably implemented as a flash converter with low latency or delay time such as a latency smaller than 1 μs. In the present embodiment of the error signal generator 113, the DC reference voltage, Ref, is applied directly to the analog-to-digital converter 112 as an analog reference voltage. This allows the analog-to-digital converter 112 to directly generating the digital error signal x[n] at the converter output as a difference between the DC output voltage (or a scaled version thereof) and the DC reference voltage Ref. The skilled person will appreciate the digital error signal x[n] may be generated in different ways in other embodiments of the error signal generator 113. An analog subtractor may for example be operatively coupled to the DC output voltage and the reference voltage to initially produce an analog error signal representative of the voltage difference between the DC output voltage and the reference voltage. The generated analog error signal or voltage may subsequently be digitized by the analog-to-digital converter to produce the digital error signal. In yet another embodiment of the error signal generator 113, the reference voltage may be provided thereto in digital representation, i.e. as a digital reference voltage or number as described below in connection with FIG. 2.

Hence, the regulation loop of the switched mode voltage regulator circuit 100 is configured to adjust or control the DC output voltage to the nominal or set-point DC voltage indicated by the DC reference voltage. The linear digital filter 116 provides proportional (P) gain to the regulation loop while the non-linear digital filter preferably provides non-linear integral (I) control to the regulation loop as explained in further detail below in connection with FIGS. 3 & 4.

Figure 2:
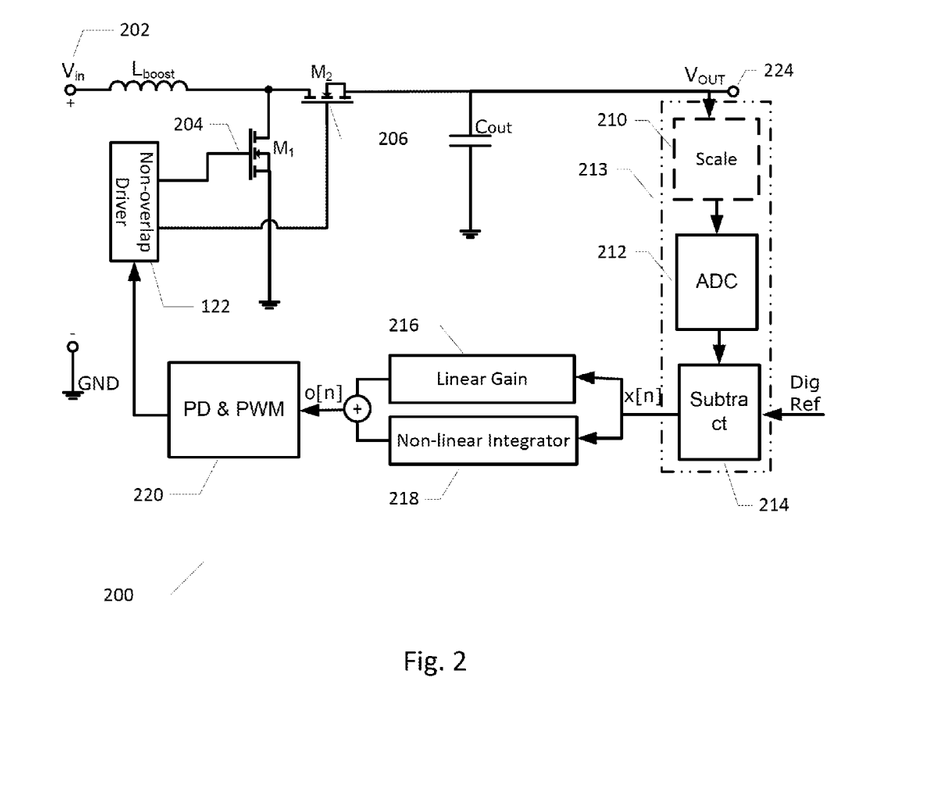
FIG. 2 illustrates schematically a switched mode voltage regulator circuit in accordance with a second embodiment of the invention.

FIG. 2 illustrates schematically a boost-type of switched mode voltage regulator circuit 200 in accordance with a second embodiment of the invention. The switched mode voltage regulator circuit 200 shares numerous features with the above described voltage regulator circuit 100 and corresponding features have been provided with corresponding reference numerals to assist comparison. The main difference is how the digital error signal x[n] is generated. In the present embodiment, the reference voltage is provided in digital representation, i.e. as a digital reference voltage or number, indicated by arrow "Dig Ref" to the error signal generator 213. An analog-to-digital converter 212, which may have similar characteristics to the above-discussed converter 112, is operatively coupled to the DC output voltage to provide a digital/digitized DC output voltage number or signal. The digitized DC output voltage signal is applied to a first input of a digital subtractor 214 while the digital reference voltage is applied to a second subtractor input. The digital subtractor 214 produces the digital error signal x[n] by subtraction of the digitized DC output voltage signal and digital reference voltage.

Figure 3:
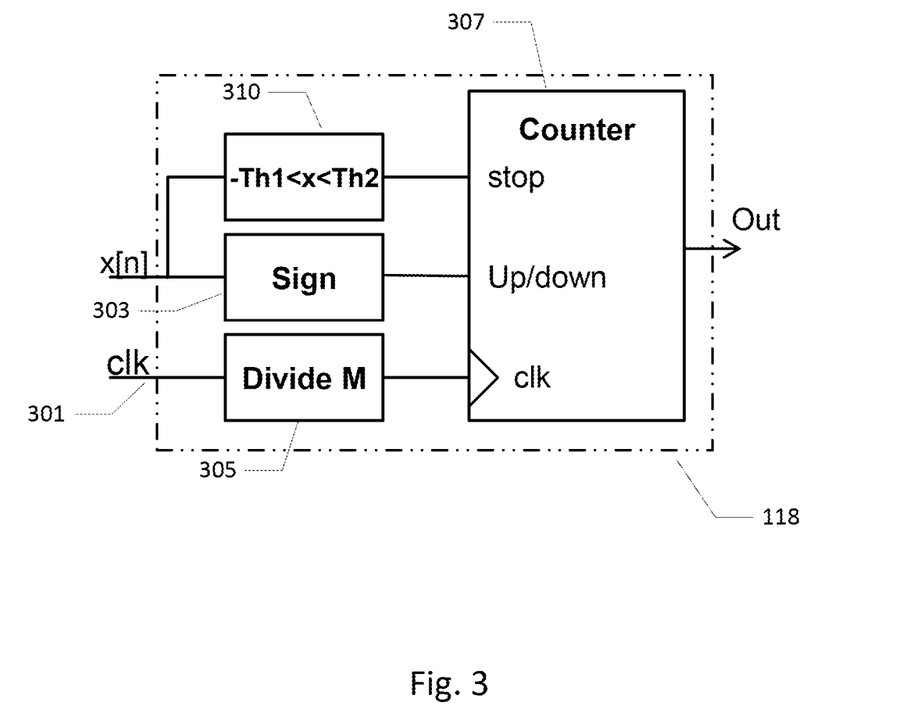
FIG. 3 is a schematic illustration of a digital counter with non-linear gain for application in the switched mode voltage regulator circuits in accordance with the first and embodiments of the invention.

FIG. 3 is a schematic illustration of the non-linear digital filter 118 based on a digital counter 307 with non-linear gain for application in the switched mode voltage regulator circuits 100 and 200 described above. The digital counter 307 functions as a non-linear integrator having an integrator gain varying in dependence of the value of the digital error signal x[n]. The digital counter 307 counts up or down for each clock signal transition in accordance with a logic setting of an Up/down input pin or terminal. The clock signal is applied to a clock input, clk, of the digital counter 307. The clock input, clk, is preferably derived from a system clock signal 301 of the switched mode voltage regulator circuit 200 and divided by a programmable divider 305 before application to the clock input, clk.

The digital error signal x[n] is applied to an input of a threshold circuit 310 of the non-linear digital filter 118. The threshold circuit 310 comprises upper and lower threshold values (indicated as Th1 and Th2) that are compared to the digital error signal x[n]. The upper and lower threshold values are preferably symmetrically arranged about a predetermined value of x[n] such as zero value. The digital error signal x[n] is furthermore applied to a sign evaluation circuit 303 of the non-linear digital filter 118. The sign evaluation circuit 303 determines a polarity or sign of x[n] and controls counting of the digital counter via the Up/down input pin to increase or decrease a current counter value according to the current polarity of x[n]. The programmable divider 305 controls the clock frequency of clock pulses applied to the clock input, clk of the digital counter 307 and hence the integrator gain of the non-linear digital filter 118. Hence, the integrator gain can be varied in a simple and effective manner by controlling an integer division factor, M, of the programmable divider 305. This can be exploited to vary the counter or integrator gain depending on the value of x[n]. The gain of the counter circuit 307 may for example be set to a first constant gain value for a certain range of x[n] and a second constant gain value outside that range. The skilled person will appreciate that the gain of the counter circuit 307 may adapted to vary in a substantially arbitrary manner as function of the value of x[n] to provide highly flexible non-linear integrator gain.

In the present embodiment, the threshold circuit 310 is configured to assert or actuate an interrupt or halt input of the digital counter 307 such that the digital counter 307 ceases to count if the value of x[n] falls between the lower and upper threshold values −Th1 and Th2. Consequently, a current value of the counter output, Out, is retained despite the application of clock pulses on the clock input, clk. This leads to an integrator gain setting of zero. The range between the upper and lower threshold values −Th1 and Th2 preferably corresponds to small numerical values of x[n], i.e. corresponding to a situation where the instantaneous voltage at $V_{OUT}$ is relatively close to the reference voltage. The integrator gain is set to a positive non-zero value numerical values of x[n] exceeding the either the upper threshold value or the lower threshold value. In one embodiment, the integrator gain jumps abruptly from zero to a predetermined value once x[n] exceeds the either the upper threshold value or the lower threshold value as schematically indicated by curve 405 of FIG. 4. In other embodiments, the integrator gain has a gradually and continuously increasing value for increasing numerical value of x[n] as schematically indicated by curve 407 of FIG. 4.

Consequently, these embodiments provide an adaptive integrator gain which varies in dependence of the numerical value of the digital error signal x[n] such that the integrator gain is smaller for small numerical values of the digital error signal, i.e. when the DC output voltage $V_{OUT}$ is relatively close to the set-point voltage indicated by the DC reference voltage, than for large values of the digital error signal where the DC output voltage $V_{OUT}$ is farther away from the set-point voltage. This adaptive integrator gain scheme allows a higher gain setting of the non-linear integrator than possible with a constant integrator gain. This is because the operating point of the switched mode voltage regulator circuit 100 where stability of the regulation loop is required lies at, or proximate to, the correct set-point output voltage where the integration gain is low and stability therefore ensured. The higher gain setting of the non-linear integrator leads to a smaller DC output voltage error due to the integrator action of the non-linear filter 118 of the regulation loop.

A further advantage of the adaptive integrator gain mechanism is that the respective regulation loops of the implemented switched mode voltage regulator circuits 100, 200 may have a tendency to add a square waveform shaped noise signal to the DC output voltage. The noise signal is caused by the fact that the smallest possible change of the combined digital error signal o[n] is 1 LSB (Least Significant Bit) which may cause o[n] to shift forth and back between two adjacent levels at constant loads or steady state at the DC output voltage. This problem is suppressed by the zero or low integrator gain for small values of the digital error signal x[n] since the integrator gain may be forced to zero. In this manner, a current value of o[n] is retained at the most optimal LSB. This feature also allows the regulation loop to operate with a fairly low number of bits in the analog-to-digital converter 112, 212 leading to lower power consumption and less circuit complexity since noise at low load power conditions is no longer influenced by the integrator LSB.

Figure 4:
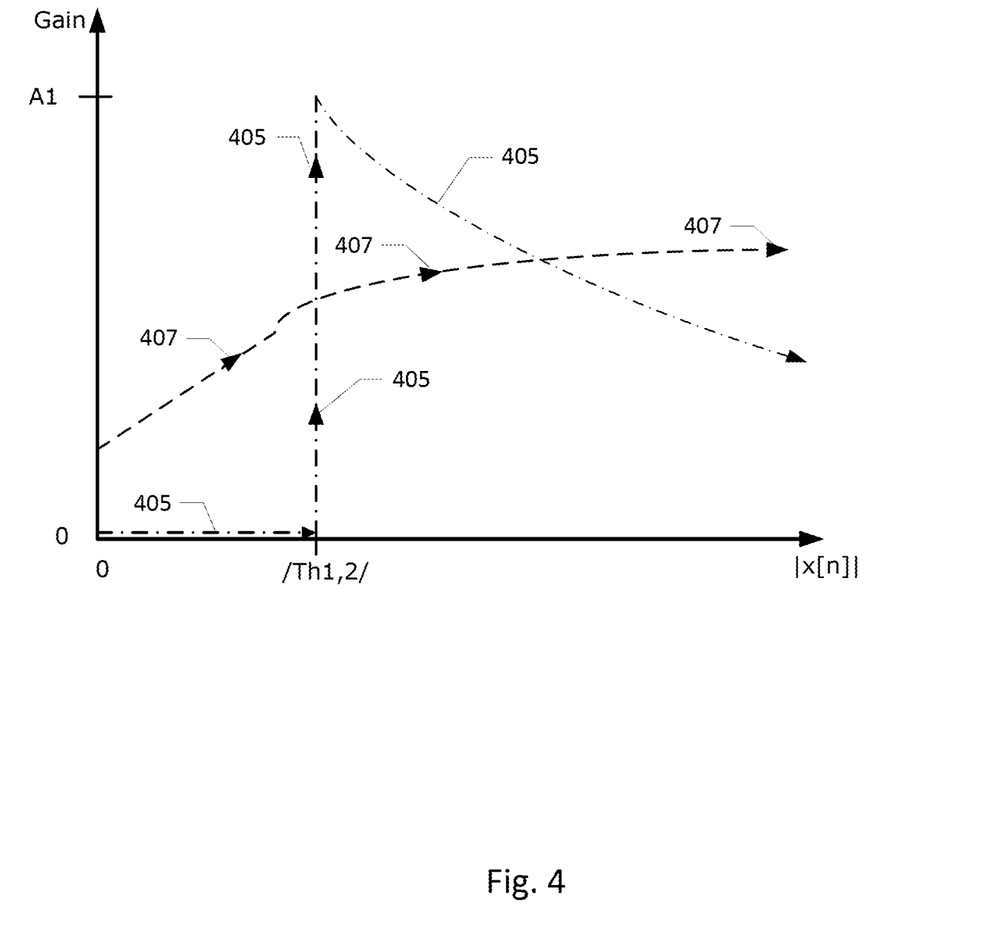
FIG. 4 illustrates exemplary values of integrator gain versus digital error signal for the digital counter with non-linear gain.

FIG. 4 illustrates two exemplary curves 405, 407 of integrator gain versus the numerical value of the digital error signal for the above-discussed non-linear integrator 118,218. Gain curve 405 shows integrator gain characteristic where the gain jumps abruptly from approximately zero, or zero, to an A1 value once the numerical value of the digital error signal x[n] exceeds threshold value /Th1,2/. When the numerical value of x[n] increases further the integrator gain gradually decreases from A1 and to a lower gain value. The decreasing integrator gain may reach a constant asymptotic gain value smaller than A1 for large values of x[n].

The integrator gain curve 407 shows another example of integrator gain characteristics. In the latter example the integrator gain is gradually and continuously increasing for increasing numerical values of the digital error signal x[n].

The skilled person will understand that numerous other integrator gain characteristics versus digital error signal values can be thought depending on the complexity of the digital logic need to control these characteristics.

Figure 5:
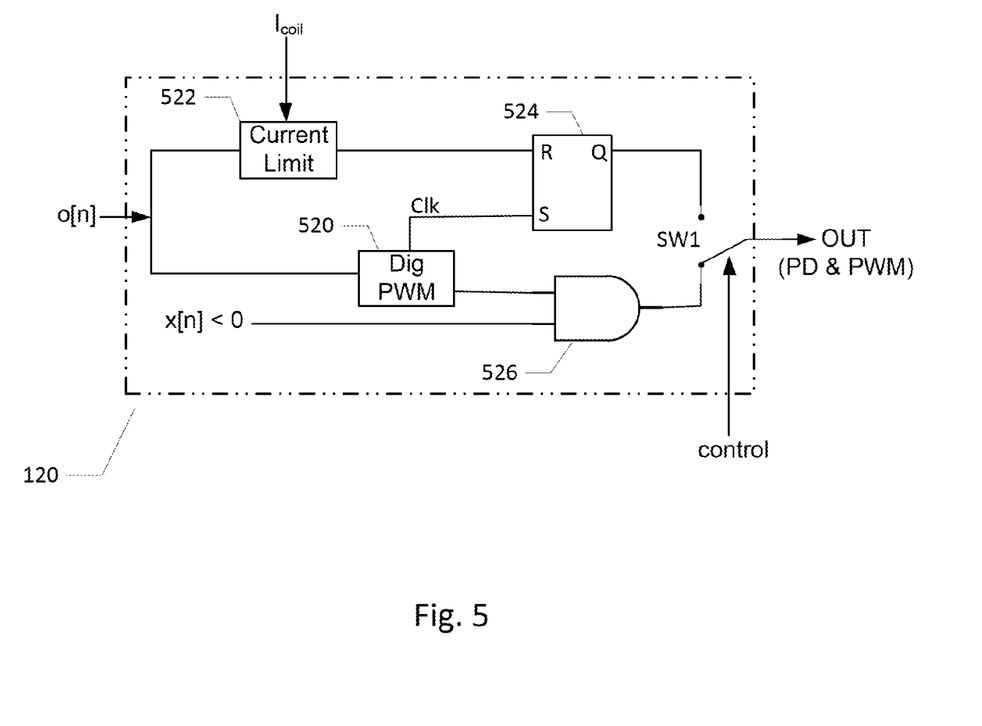
FIG. 5 is schematic illustration of a hybrid type of digital pulse modulator comprising both pulse width and pulse density modulation for application in the switched mode voltage regulator circuits in accordance with preferred embodiments of the invention.

FIG. 5 is schematic illustration of the hybrid digital modulator 120 for application in the switched mode voltage regulator circuits 100, 200 discussed above. The hybrid digital modulator 120 comprises a digital pulse width modulator 520 that accepts the combined digital error signal o[n] as input and generates either a PWM waveform or a PDM waveform reflecting the value of o[n] as the driver control signal. The output signal at output OUT of the hybrid modulator 120 is applied to the input of the non-overlapping switch driver 122 as the driver control signal to regulate charge and discharge of the converter inductor.

A switch SW1, preferably comprising a semiconductor switch, is arranged at the output, OUT, of the hybrid modulator 120 and transmits a pulse width modulated driver control signal from an upper modulation path of the hybrid modulator 120 comprising a current limiting circuit 522 and a RS-FF 524 when placed at the upper switch input terminal. In the opposite position of SW1, as illustrated on FIG. 5, either a pulse width or pulse density modulated driver control signal is generated by a lower modulation path comprising a digital PWM modulator 520 in combination with a two-input AND gate 526. The digital PWM modulator 520 is supplied with the system clock signal via the Clk input for setting a synchronous modulation or switching frequency of the pulse width modulated output waveform applied to a first input of the two-input AND gate 526. An output signal of the two-input AND gate 526 is conveyed to OUT when SW1 is placed in the depicted position while the pulse width modulated driver control signal supplied through the upper modulation path is conveyed to OUT when SW1 is the opposite position. A control signal, control, sets the position or state of SW1 based on a comparison of the value of the combined digital error signal o[n] and a threshold value. This comparison and control signal generation may be provided by an appropriately configured or programmed controller such as a finite digital state machine performing the various control operations in the present voltage regulator 100.

If the combined digital error signal o[n] exceeds the threshold value, SW1 conveys the PWM waveform of the upper modulation path to OUT. If the combined digital error signal o[n] exceeds the threshold value, it indicates that a large load is applied to the converter output voltage because o[n] represents an accumulated output voltage error. The generation of the PWM waveform of the upper modulation path is based on the RS-FF 524 which has a set input, S, coupled to the system clock signal, and a reset input, R, coupled to a logic output of the current limiting circuit 522. The system clock signal Clk, which also sets the modulation frequency of the digital PWM modulator 520, sets the output Q of RS-FF 524 to logic high which activates charging of the converter inductor $L_{boost}$ via a conducting semiconductor switch $M_1$ of the non-overlapping driver 122 (refer to FIG. 1). The charging of the converter inductor $L_{boost}$ continues until the output of current limiting circuit 522 transits to logic high which resets the output Q of RS-FF 524 to logic low. When the output Q of RS-FF 524 switches state to logic low, the semiconductor switch M1 of the non-overlapping driver 122 turns off and charging of $L_{boost}$ is interrupted. Hence, pulse widths of the PWM waveform conveyed to OUT is determined by the action of the current limiting circuit 522. A single PWM pulse is started at each transition of the system clock signal Clk and its width is determined by the transition of the output of the current limiting circuit 522. The current limiting circuit 522 responds to a coil current signal $I_{coil}$ indicating instantaneous charging current in $L_{boost}$. The current limiting circuit 522 makes a comparison of the coil current signal $I_{coil}$ and a threshold value computed from a predefined threshold function. The predefined threshold function comprises threshold values which are a function of o[n]. Overall, the upper modulation path operates in a coil current feedback mode to generate the pulse width modulated driver control at OUT for the non-overlapping switch driver 122.

If the combined digital error signal o[n] is smaller than the threshold value, SW1 conveys a hybrid PDM/PWM waveform generated by the lower modulation path to OUT. Under this condition of o[n], a small load is applied to the converter output voltage because the accumulated output voltage error is relatively small. In the lower modulation path, o[n] is applied to an input of the digital PWM modulator 520. The digital PWM modulator 520 may have a resolution between 3 and 6 bits such that between 8 and 64 distinct pulse widths are generated in the pulse width modulated output waveform in accordance with the instantaneous value of o[n]. The pulse width modulated output waveform is applied on a first input of the two-input AND gate 526 while a second input of the AND gate 526 is supplied with a logic control signal. The logic control signal is based on a comparison of the instantaneous value of the digital error signal x[n] and zero. If the instantaneous value of the digital error signal x[n] is less than zero, the condition indicates that the DC output voltage $V_{OUT}$ of the regulator 100 is smaller than the DC reference voltage such that the pulse width should be increased to increase charging of the DC output voltage. Therefore, the second input of the two-input AND gate 526 is set to logic high level or "1". In this condition, the pulse width modulated output waveform of the digital PWM modulator 520 is conveyed through the two-input AND gate and to OUT via SW1 as the switch control signal. On the other hand, when the instantaneous value of the digital error signal x[n] is larger than zero, the condition indicates the DC output voltage $V_{OUT}$ of the regulator 100 to be larger than the DC reference voltage. Hence, charging of the DC output voltage from the converter inductance should be interrupted which automatically leads to decrease of the DC output voltage by the loading imposed by the regulator load. Therefore, the second input of the two-input AND gate 526 is set to logic low level or "0" such that the pulse width modulated output waveform of the digital PWM modulator 520 is disabled at the output of the two-input AND gate 526. Hence, the switch control signal at OUT becomes static at logic "0".

Consequently, the combined effect of the interaction of the two-input AND gate 526 and digital PWM modulator 520, is that the driver control signal conveyed at OUT includes pulses with a width proportional to the instantaneous value of o[n] when x[n] is smaller than zero and no pulses when x[n] is larger than zero. Overall, the driver control signal supplied by the lower modulation path to the non-overlapping switch driver, through SW1, comprises a combination or hybrid of pulse width and pulse density modulation.

The invention claimed is:
1. A switched mode voltage regulator circuit comprising:
an input terminal for receipt of a regulator input voltage,
an output terminal for supply of an output voltage,
a power supply block configured for energy charging from the regulator input voltage in a first regulator mode and for discharge of stored energy to the output voltage in a second regulator mode,
a driver configured to supply pulse control signals to control the regulator modes of the power supply block, and a regulation loop coupled between the output voltage and the driver, the regulation loop comprising:
an error signal generator operatively coupled to one of the output voltage and a reference voltage and configured to supply a digital error signal representative of a voltage difference between the output voltage and the reference voltage,
a linear digital filter coupled for receipt of the digital error signal to provide a linearly filtered digital error signal,
a non-linear digital filter coupled for receipt of the digital error signal to provide a non-linearly filtered digital error signal,
a digital summer coupled for receipt of the linearly and the non-linearly filtered digital error signals to provide a combined digital error signal, and
a digital pulse modulator configured to modulate the combined digital error signal.

2. The switched mode voltage regulator circuit according to claim 1, wherein the error signal generator comprises an analog-to-digital converter coupled to the output voltage and the reference voltage to produce the digital error signal at a converter output.

3. The switched mode voltage regulator circuit according to claim 1, wherein the error signal generator comprises:
an analog-to-digital converter coupled to the output voltage to produce a digital output voltage representative of the output voltage,
a digital reference voltage representative of the reference voltage, and
a digital subtractor for receipt of the digital output voltage and the digital reference voltage to produce the digital error signal.

4. The switched mode voltage regulator circuit according to claim 1, wherein the error signal generator comprises:
an analog subtractor operatively coupled to one of the output voltage and the reference voltage to produce an analog error signal, and
an analog-to-digital converter operatively coupled to the analog error signal and con-figured to produce the digital error signal.

5. The switched mode voltage regulator circuit according to claim 1, comprising at least one of a boost converter, and a buck converter, a boost-buck converter.

6. The switched mode voltage regulator circuit according to claim 1, wherein the non-linear digital filter comprises a non-linear integrator,
a gain of the non-linear integrator varying in dependence of a value of the digital error signal.

7. The switched mode voltage regulator circuit according to claim 6, wherein the non-linear integrator comprises a counter circuit with a counter gain depending on the value of the digital error signal.

8. The switched mode voltage regulator circuit according to claim 7, wherein the counter circuit comprises an adjustable clock divider supplying a clock signal with a variable clock frequency to a clock input of the counter circuit.

9. The switched mode voltage regulator circuit according to claim 7, wherein the counter gain or the gain of the non-linear integrator is smaller for small numerical values of the digital error signal than for large numerical values of the digital error signal.

10. The switched mode voltage regulator circuit according to claim 9, wherein the counter gain is set to a first constant gain value between upper and lower threshold values of the digital error signal and a second constant gain value outside the upper and lower threshold values of the digital error signal, wherein the first constant gain value is smaller than the second constant gain value.

11. The switched mode voltage regulator circuit according to claim 10, wherein the upper and lower threshold values around the digital error signal are symmetrically arranged about a predetermined value of the digital error signal such as zero value.

12. The switched mode voltage regulator circuit according to claim 10, comprising a digital threshold circuit comparing the value of the digital error signal to at least one of the upper and lower threshold values,
the digital threshold circuit being configured to interrupt counting of the counter circuit for values of the digital error signal lying between the upper and lower threshold values.

13. The switched mode voltage regulator circuit according to claim 1, wherein the linear digital filter comprises a gain table mapping values of the digital error signal to proportional values of a linearly filtered digital error signal.

14. The switched mode voltage regulator circuit according to claim 1, wherein the power supply block includes a first semiconductor switch for energy charging in the first regulator mode and a second semiconductor switch for discharge of stored energy in the second regulator mode.

15. The switched mode voltage regulator circuit according to claim 2, wherein the analog-to-digital converter comprises a flash analog-to-digital converter having a resolution between 3 and 6 bits.

16. The switched mode voltage regulator circuit according to claim 2, wherein a conversion time or latency of the analog-to-digital converter is less than 1 μs.

17. The switched mode voltage regulator circuit according to claim 1, wherein the digital pulse modulator is configured to:
generate the pulse control signal comprising a combination of pulse width and pulse density modulation when a level of the combined digital error signal is below a predetermined error threshold, and
generate exclusively a pulse width modulated driver control signal when the level of the combined digital error signal is above the predetermined error threshold.

18. The switched mode voltage regulator circuit according to claim 1, wherein the output voltage comprises one of a DC output voltage and an AC output voltage.

19. A method of generating an output voltage by a switched mode voltage regulator circuit from a regulator input voltage, comprising steps of:
charging a device with energy from the regulator input voltage in a first regulator mode,
discharging stored energy to the output voltage in a second regulator mode,
generating non-overlapping control signals to set the first and second regulator modes in accordance with a pulse modulation,
generating a digital error signal representative of a voltage difference between the output voltage and a reference voltage,
generating a linearly filtered digital error signal from the digital error signal,
generating a non-linearly filtered digital error signal from the digital error signal,
combining the linearly and the non-linearly filtered digital error signals to provide a combined digital error signal, and
pulse modulating the combined digital error signal to generate the non-overlapping control signals in accordance with the combined digital error signal.

20. A regulation loop to regulate an output voltage of a voltage regulator circuit, comprising:
- an error signal generator coupled to the output voltage and a reference voltage and configured to generate a digital error signal representative of a voltage difference between the output voltage and the reference voltage,
- a linear digital filter coupled for receipt of the digital error signal to provide a linearly filtered digital error signal,
- a non-linear digital filter coupled for receipt of the digital error signal to provide a non-linearly filtered digital error signal,
- a digital summer coupled for receipt of the linearly and the non-linearly filtered digital error signals to provide a combined digital error signal, and
- a digital pulse modulator configured to generate a pulse control signal in accordance with the combined digital error signal, and to transmit the pulse control signal to a driver circuit for controlling regulator modes of the voltage regulator circuit.

* * * * *